United States Patent [19]

Dhabhar et al.

[11] 4,280,936

[45] Jul. 28, 1981

[54] DENTURE ADHESIVE OF SODIUM CARBOXYMETHYLCELLULOSE, POLY(ETHYLENE OXIDE) HOMOPOLYMER AND MINERAL OIL

[75] Inventors: Dadi J. Dhabhar; Allen Heyd, both of Norwalk; Nicholas F. Schmidt, Brookfield, all of Conn.

[73] Assignee: Richardson-Merrell Inc., Wilton, Conn.

[21] Appl. No.: 140,462

[22] Filed: Apr. 17, 1980

[51] Int. Cl.³ .................................................. C08L 1/26
[52] U.S. Cl. .................................. 260/13; 106/197 C; 156/328
[58] Field of Search .................. 260/13, 17 R; 106/35, 106/197 C; 156/328

[56] References Cited

U.S. PATENT DOCUMENTS

| 2,978,812 | 4/1961 | Rosenthal et al. .................... 433/172 |
| 3,736,274 | 5/1973 | Schoenholz et al. ............... 260/17 R |
| 3,868,259 | 2/1975 | Keegan et al. .......................... 106/35 |
| 3,926,870 | 12/1975 | Keegan et al. ............................. 260/8 |

Primary Examiner—Earl A. Nielsen
Attorney, Agent, or Firm—George W. Rauchfuss, Jr.

[57] ABSTRACT

An improved denture adhesive contains a particular amount of a specified ratio of sodium carboxymethylcellulose and poly(ethylene oxide) in a mineral oil base.

3 Claims, No Drawings

DENTURE ADHESIVE OF SODIUM CARBOXYMETHYLCELLULOSE, POLY(ETHYLENE OXIDE) HOMOPOLYMER AND MINERAL OIL

FIELD OF THE INVENTION

The invention relates to an improved denture adhesive liquid having improved adhesion/cohesion properties.

BACKGROUND OF THE INVENTION

Recently, denture adhesive liquids have been proposed or introduced as adhesives for denture wearers. When wet with water, these denture adhesive liquids expand to become a viscous gel which acts as a cushion and an adherent between the dentures and the gum tissue. As example of such denture adhesive liquids these may be mentioned, for example, the products FORGET and DENTROL of Norcliff-Thayer and Block Drug, respectively. The former is understood to contain 32% sodium carboxymethylcellulose, 13% ethylene oxide homopolymer and 55% mineral oil while the latter is understood to contain 22% sodium carboxymethylcellulose, 13% ethylene oxide homopolymer and 65% mineral oil. While these formulations may be effective in securing dentures within the oral cavity for short periods of time, it has generally been necessary to apply more than one application per day to obtain sufficient adhesion throughout the day. Such multiple applications are inconvenient and at times are impractical or impossible and, therefore, these heretofore known denture adhesive liquids are not totally acceptable and in some cases undesirable. It has therefore been desirable to provide a denture adhesive of superior adherent properties over prolonged periods of time.

SUMMARY OF THE INVENTION

A superior denture adhesive liquid composition has been found and comprises an anhydrous composition of sodium carboxymethylcellulose and ethylene oxide homopolymer in a mineral oil base and wherein the amount of sodium carboxymethylcellulose and ethylene oxide homopolymer totals 45% by weight based on the weight of the composition and the weight ratio of sodium carboxymethylcellulose to ethylene oxide polymer is essentially 3:1. The composition may also have present thickening agents, colorants and flavoring agents and the like as desired in amounts generally employed.

DETAILED DESCRIPTION OF THE INVENTION

A superior denture adhesive liquid composition of this invention comprises 45% by weight of a 3:1 weight ratio of sodium carboxymethylcellulose to ethylene oxide polymer in a mineral oil base and wherein the composition also contains from about 1.5 to about 4% by weight of low molecular weight polyethylene polymer as a thickening agent.

The sodium carboxymethylcellulose gums employed in this invention are water soluble, anionic, long chain polymers, derived from cellulose. Properties vary with the average number of carboxy methyl groups that are substituted per anhydroglucose unit in each cellulose molecule. This property is generally referred to as "the degree of substitution," with the maximum substitution possible designated as "3.0" since there are just three hydroxy groups capable of reaction in each anhydroglucose unit. For the practice of this invention, it has been found that one or more cellulose gums having a degree of substitution of from 0.4 to 1.2 is suitable. The viscosity of 1 percent solution of the gum, measured at 25° C., should be in the range of from about 400 to 4,500 preferably 1,500 to 2,500 centipoises.

Sodium carboxymethylcellulose gums of this type are more fully described in "Chemical and Physical Properties: Cellulose Gum," 1978, published by Hercules, Incorporated, Coatings and Specialty Products Department, 910 Market Street, Wilmington, Del. 19899.

As examples of commercially available sodium carboxymethylcellulose gums suitable for use in this invention there may be mentioned those sold by Hercules Incorporated, Wilmington, Del., as types 4H1, 7H, 9H4, 7H3S, 7HOF and 7H4. Type 7H3S is preferred for use in this invention.

The ethylene oxide homopolymers employed in the compositions of the invention are water soluble nonionic poly(ethylene oxide) homopolymers having molecular weights of from about 100,000 to about 5,000,000. The polymers have the structure $-(O-CH_2CH_2)_n-$ wherein n represents the degree of polymerization and has a value of from about 2,000 to about 100,000. These polymers are white powders.

Poly(ethylene oxide) homopolymers of this type are more fully described in "Polyox", 1978, published by Union Carbide Corporation, 270 Park Avenue, New York, N.Y. 10017, as Technical Bulletin F-44029B.

As examples of commercially available powdered poly(ethylene oxide) homopolymers suitable for use in this invention there may be mentioned those polymers sold by Union Carbide Corporation under the trademark POLYOX as grades WSR N-10, WSR N-80, WSR N-750, WSR N-3000, WSR-205, WSR-1105 and WSR-301. Preferred for use in this invention is POLYOX WSR-301 homopolymer.

The powdered low molecular weight polyethylene polymers suitable for use in the practice of this invention have an average molecular weight ranging from about 1,000 to 5,000, preferably from about 2,000 to 2,500 and a particle size of less than about 422 microns, preferably between about 74 to 149 microns. The particle size may also be stated in terms of the mesh size, i.e., not larger than 40 mesh, preferably between about 100 to 200 mesh. Powdered polyethylene polymers having an average molecular weight of about 2,000 and a particle size of about 74 microns (200 mesh) are especially preferred.

As examples of commercially available powdered polyethylene products suitable for use in this invention, there may be mentioned those sold by Allied Chemical Company, Morristown, N.J., under the name A-C Polyethylene 6A, A-C Polyethylene 8A, A-C Polyethylene 9A, A-C Polyethylene 6AF, A-C Polyethylene 8AF and A-C Polyethylene 9AF. Similarly, powdered polyethylene products sold by United States Industries, Park Avenue, New York 10017, as their Microthene series are also suitable. Preferred for use in this invention is A-C Polyethylene 6-A.

The low molecular weight polyethylene polymers are employed as thickening agents to give stability to the composition to prevent phase separation and to provide body and viscosity to the composition. The amount of polyethylene employed will generally be from about 1.5 to about 4% by weight and preferably from about 2 to about 3% and most preferably about 2.5% by weight.

Any suitable flavoring agents, colorants or other optional ingredients generally employed in denture adhesives may be added, if desired, so long as their addition is not detrimental to the overall adhesive ability of the denture adhesive composition. Mineral oil forms the base of the composition and will constitute the remaining portion of the denture adhesive composition.

As an example of an especially preferred denture adhesive liquid composition of this invention there may be mentioned for example the following exemplary composition:

| Component | Weight Percent |
|---|---|
| Sodium carboxymethylcellulose (7H3S) | 33.75% |
| Poly(ethylene oxide) homopolymer (Polyox WSR-301) | 11.25% |
| Polyethylene (A-C 6A) | 2.5% |
| Flavoring agents | 0.3% |
| Colorant | 0.015% |
| Mineral Oil | 52.185% |

The compositions of this invention can be produced by mixing the mineral oil with the thickening agent, such as A-C Polyethylene 6A, and any colorant employed with stirring and heating to a temperature of about 90° C. until the ingredients are dissolved and the mixture is substantially clear. After cooling the solution down to about 45° C. using a cold water bath the solution is transferred to a mixer and the sodium carboxymethylcellulose, such as CMC 7H3S, and the poly(ethylene oxide) homopolymer, such as POLYOX WSR-301, are added with mixing until it is substantially completely mixed and the product cools to about 35° C. or below. Thereafter, a flavoring agent, if desired, can be added with mixing at high speed.

The denture adhesive compositions of this invention possess superior and unexpected adhesion/cohesion properties even when compared to similar compositions but containing less than 45% of the 3:1 sodium carboxymethylcellulose/poly(ethylene oxide) homopolymer mixture and also when compared to similar compositions containing 45% of the mixture but in ratios other than the 3:1 ratio of this invention. Additionally, the compositions of this invention possess unexpectedly superior properties compared to similar compositions but where both the total amount of polymer mixture and the ratio thereof is different than that of the compositions of this invention including the marketed product DENTROL of Block Drug which is understood to contain 22% sodium carboxymethylcellulose and 13% poly(ethylene oxide) homopolymer (ratio 1.7:1 and total amount of polymer equal to 35% by weight).

The unexpected superiority of the compositions of the present invention at the 45% by weight amount and in the 3:1 weight ratio is shown by the data set forth in the following table. The test product was subjected to a test procedure (Instron test) designed to measure the forces of adhesion and compression generated by the test product placed between two moving plates that are immersed in an artificial saliva solution. The plates move away from and toward each other at the rate of 2.68 cycles per minute. The forces generated are measured until decay or wash-out takes place.

TABLE

IN-VITRO WASHOUT DATA ON TEST COMPOSITIONS

| Test Composition | Ratio of Polymers | Total Conc. Polymers | Adhesion No. Cycles* | Adhesion No. Hours | Compression No. Cycles* | Compression No. Hours |
|---|---|---|---|---|---|---|
| A | 3:1 | 45% | >1,000 | 6 | >1,000 | 6 |
| B | 1:1 | 30% | 100 | ½ | 100 | ½ |
| C | 2:1 | 35% | 150 | 1 | 150 | 1 |
| D | 3:1 | 35% | 300 | 1¾ | 300 | 1¾ |
| E | 3:1 | 40% | 400 | 2¾ | 400 | 2¾ |
| F | 4:1 | 35% | 100 | ½ | 100 | ½ |
| G | 4:1 | 45% | 700 | 4 | 700 | 4 |
| H | 5:1 | 42% | 600 | 3½ | 600 | 3½ |
| Dentrol | 1.7:1 | 35% | 800 | 4¾ | 800 | 4¾ |

*1 Cycle equals 0.35 Minute

The data obtained show clearly the unexpected nature of the results obtained with a composition of this invention wherein the time to decay for the test composition of the invention, Composition A, was greater than 1,000 cycles or more than 6 hours whereas none of the other test compositions or the commercial product DENTROL even approached such results.

The anhydrous denture adhesive liquids of the invention, when in contact with moistened denture plates and the saliva, hydrate within the oral cavity to provide superior adherent properties not possessed by heretofore known denture adhesive liquids.

We claim:

1. An anhydrous denture adhesive liquid composition consisting essentially of sodium carboxymethylcellulose, poly(ethylene oxide) homopolymer and mineral oil wherein the sodium carboxymethylcellulose and poly(ethylene oxide) homopolymer are present in a weight ratio of about 3:1 and together comprise about 45 weight percent of the total composition.

2. A composition of claim 1 having present in the composition from about 1 to about 4 weight percent of low molecular weight polyethylene having a molecular weight of about 1,100 to about 5,000.

3. A composition of claim 2 comprising about 33.75 weight percent of sodium carboxymethylcellulose, about 11.25 weight percent of poly(ethylene oxide) homopolymer, about 2.5 weight percent polyethylene and about 52.185 weight percent of mineral oil.

* * * * *